(Model.)

F. ECKSTEIN, Jr.
DRIVE CHAIN.

No. 340,300.  Patented Apr. 20, 1886.

ATTEST
William W. Dodge.
Jas. F. DuHamel.

INVENTOR
Fred Eckstein Jr.
By Parkinson & Parkinson
His Attorneys.

UNITED STATES PATENT OFFICE.

FRED ECKSTEIN, JR., OF CINCINNATI, OHIO.

DRIVE-CHAIN.

SPECIFICATION forming part of Letters Patent No. 340,300, dated April 20, 1886.

Application filed September 4, 1884. Serial No. 142,167. (Model.)

*To all whom it may concern:*

Be it known that I, FRED ECKSTEIN, Jr., a citizen of the United States, residing at Cincinnati, in the county of Hamilton and State of Ohio, have invented certain new and useful Improvements in Drive-Chains, of which the following is a specification.

My invention relates to that class of drive-chains composed of detachable links; and it consists in a novel construction of the links, by which a practically universal coupling is secured and power may be transmitted to shafts at an angle to each other or the direction of motion may be reversed.

Figure 1:
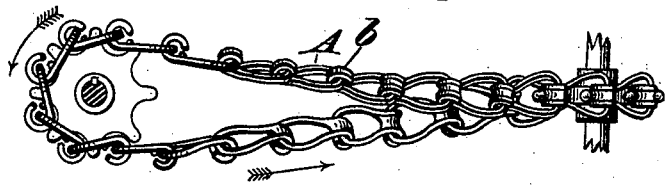
Figure 2:
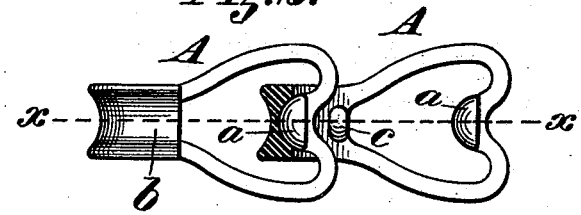
Figure 3:
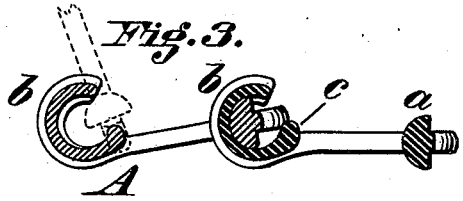

In the drawings, Figure 1 represents a drive-chain constructed in accordance with my invention applied to two sprocket-wheels turning in planes at right angles to each other. Fig. 2 is a top plan view of one of the links, showing an adjacent link, partly in section. Fig. 3 is a section view on the line X X of Fig. 2.

A is a link, the side bars of which form a sprocket opening closed at one end by a re-entrant bend, $a$, of said bars. Where the link is of heavy metal, for large chains, it will be sufficient to preserve the same diameter both in the side bars and in the transverse portion in which the re-entrant bend is formed, the inner face of said bend being naturally rounded and forming a spheroidal bearing, as will presently appear. When the chain is a light one, however, or even one of heavy metal, if so desired, an enlargement or knob, $a'$, may be formed at the apex of this re-entrant bend, having, like the first construction, a spheroidal face. This being the specific form shown, it will be sufficient to describe its construction in order to understand my invention in its general features. At the end opposite to the knob the side bars merge into a hook, $b$, having a rounded channel or groove on its inner face, which is continued to the point, affording a concave surface adapted to receive and take the bearing of the spheroidal face of the re-entrant bend or knob of a second link of like construction. Opposite said inner groove portion, at the end of the hook, is a lug, $c$, which extends up toward said groove and partly closes the throat of the hook, leaving between its own faces and the walls of the groove a bent or irregular opening corresponding to the outline of the link at its re-entrant portion, so that the said re-entrant part, when the link in which it is formed is turned at right angles to the plane of the body of the second link, will be prevented from escaping. In the latter position, lying in the length of the chain, the contact of its spheroidal face with the concave bearing in the hook will allow it free flexible and torsional play within all desirable ranges, thus permitting the chain to be thrown over sprocket-wheels on shafts at inclinations to each other measuring from a few degrees to a right angle or more.

While I have described the throat of the hook as partly closed by a lug projecting toward and practically into the concave groove, it is evident that the principle of my invention comprehends a plane surface at the point where this lug is placed, provided that the re-entrant knob is sufficiently thickened in that diameter parallel with the length of the link to fill the space between said plane surface and the walls of the groove when being inserted therein, and of sufficiently greater diameter at right angles to the plane of the body of the link to prevent its escape from the groove when it has been brought into effective position as a part of the chain. Should the latter construction be adopted, it is obvious that the exterior of the link at the end where the knob is located may be straight or level from one side bar to the other.

The heart-shaped sprocket-openings shown in the drawings are absolutely essential only where the frame-bars are of the same thickness both at the side and at the re-entrant end. The indentation or re-entrant part in such case allows the link to be slipped past the projection or lug $c$ in coupling with another link. Some greater freedom of movement is, however, due to the re-entrant bend as it carries the side bars away from contact with the edges of the hook, and it will generally be found desirable to adopt substantially such outline.

The hook, besides its interior groove, has in the present instance an exterior groove, which receives and serves as a bearing for the driving-pin on the sprocket-wheel; but whenever this driving-pin is conversely grooved the face of the hook may be rounded to fit into such groove, one construction being merely the reverse of the other.

I claim as my invention—

1. As an improvement in drive-chains, a detachable sprocket-link having at one end a re-entrant bend, and at the opposite end an internally-grooved hook, the bent throatway of which corresponds in outline with the re-entrant bend of a second link of like construction, whereby one link may be coupled with another by bringing the two in planes at right angles, or nearly so, one to the other.

2. As an improvement in drive-chains, a detachable sprocket-link having at one end a re-entrant spheroidal knob, and at the opposite end a cup-shaped hook adapted to receive and serve as a bearing for the knob of an adjacent link of like construction.

3. As an improvement in drive-chains, a sprocket-link provided at one end with a re-entrant spheroidal knob whose diameter in the line of the length of the link is less than its diameter at right angles thereto, and at the opposite end with a cup-shaped hook, the throat of said hook being formed in such manner as to admit the re-entrant knob of an adjacent link of like construction when its shortest diameter is presented thereto, but otherwise to bar its passage.

4. As an improvement in drive-chains, a sprocket-link having at one end a re-entrant spheroidal-faced knob, and at the other end a cup-shaped hook the interior of which is adapted to receive and serve as a bearing for the re-entrant knob of an adjacent link of like construction, and provided with a lug or projection which partly closes the throat of the hook.

5. As an improvement in drive-chains, a detachable sprocket-link having at one end a re-entrant spheroidal-faced knob, and at the opposite end a hook grooved in its outer and inner face, the inner groove forming a concave socket adapted to receive and serve as a bearing for the spheroidal-faced knob of an adjacent link of like construction, and the outer groove serving as a guide and bearing for the sprocket-pins.

6. As an improvement in drive-chains, a sprocket-link having at one end a re-entrant spheroidal knob, the side bars of said link extending rearward, outward, and forward from said knob, and merging at the other end in a solid band grooved in its upper and lower face and turning up and over to form a hook, and provided with a lug partly closing the mouth of said hook.

7. The combination, to form a metallic chain flexible in all its axes, of a series of detachable links, each provided at one end with a re-entrant spheroidal knob, and at the other end with a cup-shaped hook adapted to receive and serve as a bearing for the re-entrant knob of an adjacent link, and having its throat partly closed by a lug, which bars the accidental escape of said knob, substantially as described.

FRED ECKSTEIN, Jr.

Witnesses:
L. VASSALL.
GEO. B. PARKINSON.